US008401131B2

(12) United States Patent
Fety et al.

(10) Patent No.: US 8,401,131 B2
(45) Date of Patent: Mar. 19, 2013

(54) REDUCTION OF INTERFERENCE IN AN OFDM SIGNAL WITH WEIGHTING VECTORS EVOLVING IN VECTOR SUBSPACES

(75) Inventors: Luc Fety, Paris (FR); Philippe Mege, Bourg la Reine (FR); Laurent Martinod, Le Chesnay (FR)

(73) Assignee: EADS Secure Networks, Elancourt (FR)

( * ) Notice: Subject to any disclaimer, the term of this patent is extended or adjusted under 35 U.S.C. 154(b) by 371 days.

(21) Appl. No.: 12/747,111

(22) PCT Filed: Dec. 9, 2008

(86) PCT No.: PCT/EP2008/067155
§ 371 (c)(1),
(2), (4) Date: Sep. 10, 2010

(87) PCT Pub. No.: WO2009/074587
PCT Pub. Date: Jun. 18, 2009

(65) Prior Publication Data
US 2010/0322339 A1 Dec. 23, 2010

(30) Foreign Application Priority Data
Dec. 11, 2007 (FR) ...................................... 07 59755

(51) Int. Cl.
*H03D 1/04* (2006.01)
(52) U.S. Cl. ........................................................ 375/346
(58) Field of Classification Search .................. 375/248, 375/346
See application file for complete search history.

(56) References Cited

U.S. PATENT DOCUMENTS
6,437,737 B1 * 8/2002 Azzarelli et al. .............. 342/360
7,269,263 B2 * 9/2007 Dedieu et al. .................... 381/92

FOREIGN PATENT DOCUMENTS
WO   WO 2007/035993   4/2007

OTHER PUBLICATIONS

Joonbeom Kim, et al., "Robust V-blast MIMO-OFDM Channel Estimators in Time-Varying Channels," Global Telecomm. Conference, vol. 6, No. 28, Nov. 2005.

* cited by examiner

*Primary Examiner* — Jaison Joseph
(74) *Attorney, Agent, or Firm* — Novak Druce Connolly Bove + Quigg LLP

(57) ABSTRACT

To reduce interferences in signals received by a receiver through a propagation channel, each including symbols distributed according to frequency and time dimensions and corresponding to a common emitted signal, the receiver weights an estimate of the emitted signal and the received signals by weighting vectors evolving in vector subspaces representing time variations and frequency variations of the channels for propagating the signals between an emitter and the receiver. These vector subspaces are defined by matrices, some columns of which are suppressed as a function of frequency and time constraints of the channel. The receiver minimizes a function of the difference between the sum of weighted received signals and the weighted estimate of the emitted signal in order to estimate the emitted signal as a function of the weighting vectors and the received signals.

13 Claims, 3 Drawing Sheets

REDUCTION OF INTERFERENCE IN AN OFDM SIGNAL WITH WEIGHTING VECTORS EVOLVING IN VECTOR SUBSPACES

CROSS-REFERENCE TO RELATED APPLICATIONS

This application is a §371 national stage entry of International Application No. PCT/EP2008/067155, filed Dec 9, 2008, which claims priority to French Patent Application 0759755, filed Dec. 11, 2007, the entire contents of which are incorporated herein by reference.

FIELD OF THE INVENTION

The present invention relates to reducing interferences in a radio electric signal including symbols divided distributed according to frequency and time dimensions. The symbols have been, for example, undergone to a modulation according to an Orthogonal Frequency Division Multiplexing OFDM. More particularly, the invention relates to iteratively reducing interferences which are mixed with the radio electric signal.

The invention finds applications in particular in the field of Professional Mobile Radio (PMR) systems.

BACKGROUND OF THE INVENTION

A radio electric signal modulated according to the orthogonal frequency division multiplexing OFDM is distributed into a great number of subcarriers in a wide frequency band compared to the separation between the subcarriers. The signal is thus emitted by an emitter on different subcarriers such that the signal received by a receiver can be processed in order to restore the emitted signal in spite of potential destructive interferences due to the multiple propagation paths of the signal.

Noise and interferences undergone by the signal during its propagation between the emitter and the receiver degrade the signal reception. An insufficient treatment of noise and interferences leads to a high decoding error rate.

In the state of the art, noise and interferences can be processed by comparing a signal resulting from the combination of signals respectively received by the antennas with an estimate of the emitted signal.

Figure 1:
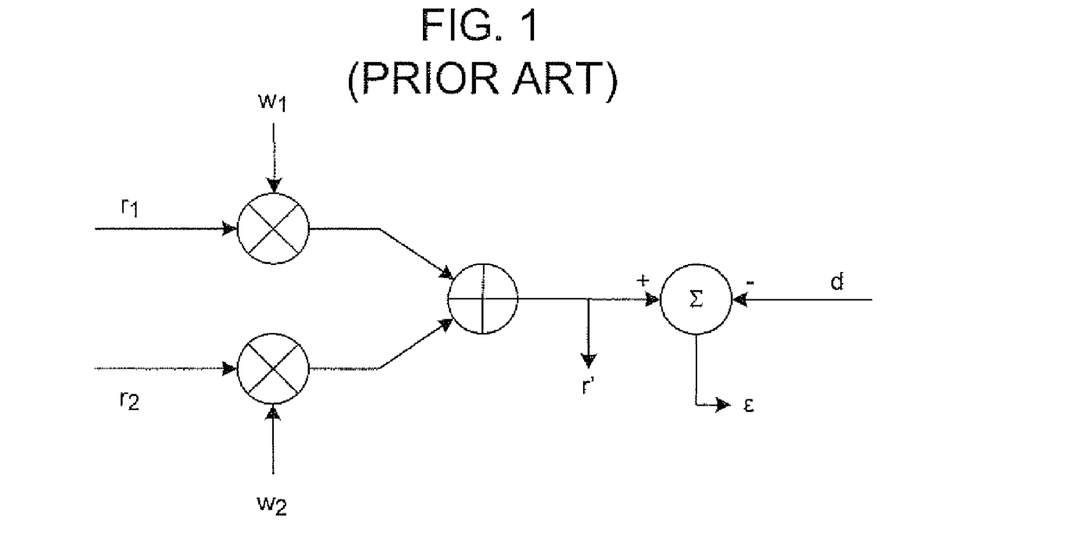
FIG. 1 is a diagram showing a conventional approach for reducing interferences.

In FIG. 1, an example is given in the case of two receive antennas having received signals $r_1$ and $r_2$ respectively. Weightings $w_1$ and $w_2$ are applied to signals $r_1$ and $r_2$ respectively, and then the two weighting signals are summed in order to obtain a signal r' from which an estimate d of the emitted signal is subtracted. A function of the resulting difference signal $\epsilon$ is minimized. For example, the sum of the squared standard of the values of $\epsilon$ for the symbols of the frame is minimized. Finally, the signal r' is processed in order to estimate the emitted signal.

The estimate of the emitted signal can be known a priori from the receiver, as is the case for example for pilot symbols inserted into each emitted frame and known from the emitter and receiver. The estimate of the emitted signal can also be obtained by a preliminary processing of signals received on the different antennas, for example using a technique known as MRC (Maximum Ratio Combining).

The processing described in FIG. 1 can be applied iteratively, with the data estimated at iteration i being partly or entirely used as an estimate d of the emitted signal for the following iteration i+1. Noise and interferences are reduced by estimating the emitted signal at each iteration and by calculating the difference, for each symbol of the OFDM frame, between the estimate of the emitted signal and the weighted sum of signals respectively received by antennas until this difference tends towards a limit value.

The combination of signals received by the different antennas helps suppress or reduce the level of interferences remaining in the resulting signal. By comparing this weighted signal with the emitted signal (more precisely the estimate of the emitted signal), weighting to be applied to each of the signals received by the different antennas can be optimized such as to suppress or reduce existing interferences.

SUMMARY OF THE INVENTION

The object of the invention is to improve the reduction of interferences in a signal received in a digital radio communication receiver in order, in particular, to enhance the symbol decoding performance of the symbols in the received signal and to reduce the decoding error rate.

To achieve this object, a method for reducing interferences in at least two signals received by a receiver through a propagation channel, the received signals each including symbols distributed according to frequency and time dimensions and corresponding to a common emitted signal, is characterized in that it includes, for each received signal frame, the steps of:

weighting the symbols of each received signal respectively by coefficients of a weighting vector associated with a respective antenna of the receiver and the symbols of an estimate of the emitted signal by coefficients of another weighting vector, the weighting vectors each being a product of a rectangular matrix having a number of columns lower than the number of rows and a reduced vector, the matrices being determined as a function of physical constraints of the propagation channel relating to frequency spreading and time spreading, minimizing a function of the difference between the sum of the weighted received signals and the weighted estimate of the emitted signal in order to determine the reduced vectors, and determining the weighting vectors as a function of the determined reduced vectors and estimating the emitted signal as a function of the determined weighting vectors and the received signals.

According to the invention, the decoded signal in the receiver becomes less sensitive to interferences due to signals propagated in channels similar to the propagation channel of the received signal.

The matrices are selected as a function of physical constraints of the propagation channel relating to frequency spreading and time spreading. According to a preferred embodiment of the invention, the rectangular matrices relating to the received signals can be identical as the physical constraints applied to them are of the same kind.

According to another feature of the invention, for each received signal frame, the symbols of the frame can be arranged from the first symbol of each subcarrier of the signal to the last symbol of the subcarrier, each subcarrier being ranked after the previous one, and the rectangular matrices can be matrices deriving from the Kronecker product of first and second Fourier matrices.

According to the invention, the matrices relating to the received signals can each be a matrix deriving from a matrix which is the Kronecker product of a first matrix, called as a Fourier transform [FFT] matrix, having a size M×M for expressing a constraint on the time profile of the propagation channel observed along the frequency axis, by a second matrix, called as an inverse Fourier transform [IFFT] matrix, having a size N×N for expressing a constraint on the frequency spectrum of the propagation channel observed along the time axis.

According to other features of the invention, for the rectangular matrices relating to the received signals, the columns of the first Fourier matrix corresponding to time delay components located beyond a maximum time spreading of the propagation channel can be suppressed, and for the rectangular matrix relating to the estimate of the emitted signal, the columns of the first Fourier matrix corresponding to time delay components located beyond a twofold maximum time spreading of the propagation channel can be suppressed. Besides, for the rectangular matrices relating to the received signals, the columns of the second Fourier matrix corresponding to the frequency components located outside a frequency spreading range of the propagation channel are suppressed, said frequency spreading range being dependent on the Doppler frequency ($F_{max}$) corresponding to a maximum speed of relative displacement between an emitter and the receiver, and for the rectangular matrix relating to the estimate of the emitted signal, the columns of the second Fourier matrix corresponding to frequency components located outside a range corresponding to a twofold frequency spreading of the propagation channel can be suppressed.

Further, columns can be suppressed in both matrices of the Kronecker product by complying with the rules described above.

According to other features of the invention, the estimate of the emitted signal can include pilot symbols and can include estimations of emitted symbols obtained in a previous processing. The estimate of the emitted signal can therefore be obtained by a preliminary processing of the signals received on different antennas of the receiver, for example through a technique known as Maximum Ratio Combining MRC.

According to a particular embodiment of the invention, the values of the estimate of the emitted signal can be taken into account only for some symbols of the received signal frame, and the method can include minimizing the function of the difference between the sum of the weighted received signals and the weighted estimate of the emitted signal, said difference being limited to said some symbols of the received signal frame.

According to the invention, the weighting, minimizing and determining steps can be iterative in order to better optimize the difference between the sum of the two weighted signals and the weighted estimate of the emitted signal and to reduce errors in the estimate of the emitted signal.

The function of the difference between the sum of the weighted received signals and the weighted estimate of the emitted signal can take different forms. The invention aims at reducing such difference in order to optimize a criterion such as, for example, maximizing a signal-to-noise ratio or minimizing an average error rate.

According to another feature of the invention, the method can include minimizing the sum of the squared standard of the values of the difference between the sum of the weighted received signals and the weighted estimate of the emitted signal for all the symbols in the received signal frame, under the constraint that there is at least one linear combination of the components of the reduced vectors which is constant. In particular, in a particular embodiment of the invention, one constraint is to force one of the components of the reduced vector relating to the estimate of the emitted signal to have a constant value and the sum of the squared standard of the values of the difference between the sum of the weighted received signals and the weighted estimate of the emitted signal for all the symbols in the received signal frame is minimized under this constraint.

According to another feature of the invention, the method can include minimizing the function of the difference between the sum of the weighted received signals and the weighted estimate of the emitted signal, said function being the average of binary error rates estimated after demodulating symbols in the received signal frame.

The invention also relates to a receiver for reducing interferences in at least two signals received by the receiver through a propagation channel, the received signals each including symbols distributed according to frequency and time dimensions, and corresponding to a common emitted signal. The receiver is characterized in that it includes:

means for weighting the symbols of each received signal respectively by coefficients of a weighting vector associated with a respective antenna of the receiver and the symbols of an estimate of the emitted signal by coefficients of another weighting vector, the weighting vectors being each a product of a rectangular matrix having a number of columns lower than the number of rows and a reduced vector, the matrices being determined as a function of physical constraints of the propagation channel relating to frequency spreading and time spreading, means for minimizing a function of the difference between the sum of the weighted received signals and the weighted estimate of the emitted signal in order to determine the reduced vectors, and means for determining the weighting vectors as a function of the determined reduced vectors and estimating the emitted signal as a function of the determined weighting vectors and the received signals.

Lastly, the invention relates to a computer program adapted to be implemented in a receiver for reducing interferences in at least two signals received by the receiver through a propagation channel, said program including instructions which, when the program is executed in said receiver, carry out the steps in accordance with the method of the invention.

BRIEF DESCRIPTION OF THE DRAWINGS

Other features and advantages of the present invention will become more clearly apparent on reading the following description of several embodiments of the invention given by way of nonlimiting example and with reference to the corresponding appended drawings in which.

DETAILED DESCRIPTION

Generally, the invention described hereinafter relates to a radio communication receiver in a digital cellular radio communication network. The receiver has at least two receive antennas and communicates with an emitter with one or more emit antennas. For example, the emitter is a base station and the receiver is a mobile terminal.

In a first example, the radio communication network is a digital cellular radio communication network, for example of GSM type ("Global System for Mobile communications"), or UMTS type ("Universal Mobile Telecommunications System"), or a wireless local network of WLAN type ("Wireless Local Area Network") or WIMAX type ("World wide Interoperability Microwave Access").

In a second example, the radio communication network is an ad hoc wireless local network without any infrastructure. The emitter and the receiver communicate directly with each other directly and spontaneously without any intermediate communication centralizing equipment such as an access point or station, or a base station.

In the radio communication network, interferences between symbols in a user signal and multiple access interferences between signals of several users are generated by the propagation in a propagation channel between the emitter and the receiver and degrade the quality in the received signal. Such degradations can be reduced by estimating the transfer function in the propagation channel which can be carried out by means of an information known in advance from the receiver, such as a pilot sequence continuously emitted by the emitter. Then, the received signal includes a useful signal corresponding to data to be emitted, being mixed with interferences and additive noise.

Figure 2:
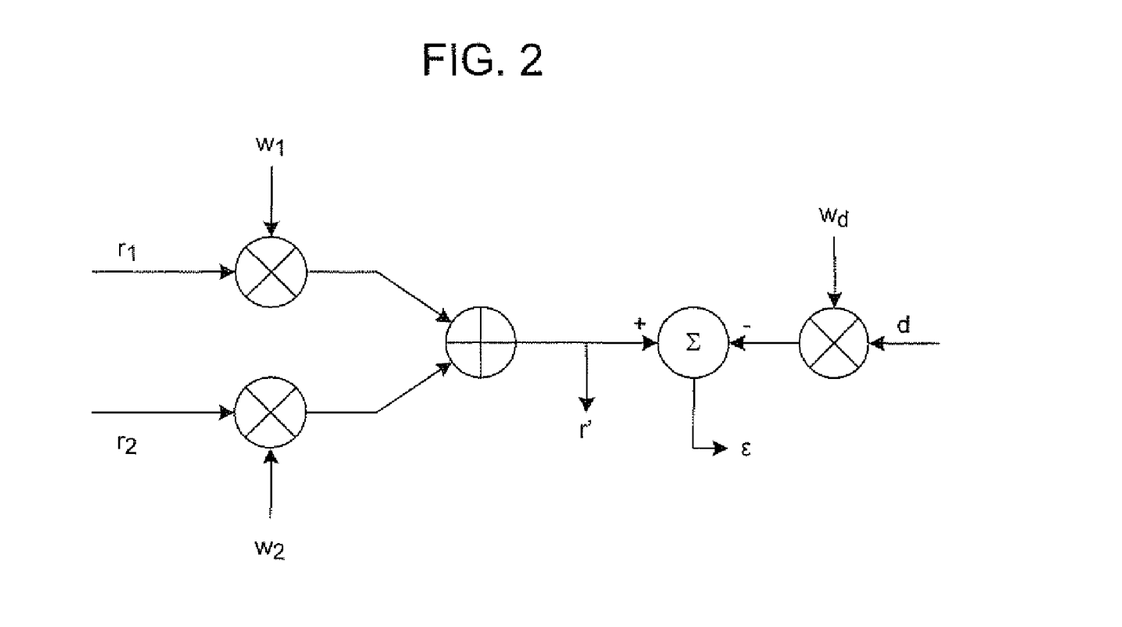
FIG. 2 is a diagram showing an interference processing according to the invention.

In FIG. 2, an example is given of the case of two receive antennas in a receiver having received signals $r_1$ and $r_2$ respectively. Weightings $w_1$ and $w_2$ are applied to signals $r_1$ and $r_2$ respectively, and then both weighted signals are summed in order to obtain a signal r' from which an estimate of the emitted signal d, weighted by a weighting $w_d$ is subtracted. The resulting difference $\epsilon$ is representative of the error, a function of which is minimized. Finally, the signal r' is processed for estimating the emitted signal.

Figure 3:
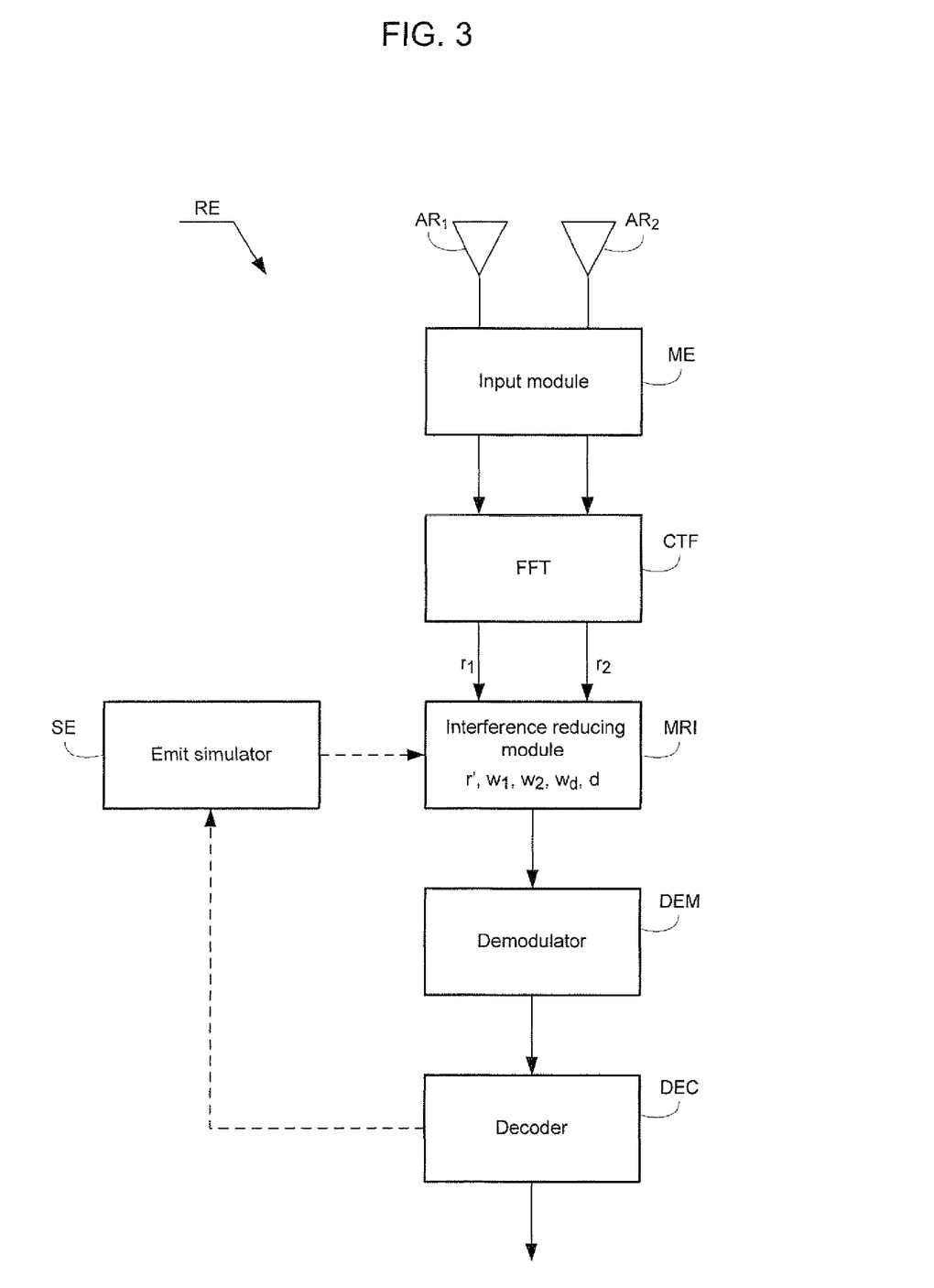
FIG. 3 is a schematic block diagram of a radio communication receiver according to the invention.

FIG. 3 shows functional means included in a radio communication receiver RE with several receive antennas for implementing the method of the invention in a digital radio communication network. The receiver RE in particular includes an input module ME, a time-to-frequency converter CTF, an interference reducing module MRI, a demodulator DEM and a decoder DEC. To avoid overloading FIG. 3, it will be assumed hereinafter that the receiver includes at least a first receive antenna $AR_1$ and a second receive antenna $AR_2$ connected to the input module ME.

A signal received by each receive antenna $AR_1$, $Ar_2$ of the receiver RE through the propagation channel goes through, for example in the input module ME of the receiver, stages of amplification, baseband shaping, sampling and guard interval suppression before being submitted to a fast Fourier transform in the time-to-frequency converter CTF in order to convert the received signal from time domain to frequency domain. Each sample of the frequency domain is called as a subcarrier. Generally, the converter CTF applies a reception adaptive time filtering to the received signal before the latter undergoes the fast Fourier transform.

The signal received by each antenna of the receiver is emitted by the emitter as successive frames (so-called OFDM frames) comprising symbols distributed along a time dimension and a frequency dimension, i.e. along a time axis and along a frequency axis. For example, the signal is emitted on M subcarriers in a frame divided into N consecutive time intervals of symbol individually dedicated to the transmission of M symbols.

The propagation channel between a transmission antenna and a receive antenna $AR_1$, $AR_2$ can be modeled by complex coefficients $\alpha_{m,n,1}$, $\alpha_{m,n,2}$ of the transfer function in the propagation channel respectively associated with subcarriers m, with $0 \leq m \leq M-1$, for a given time interval n, with $0 \leq n \leq N-1$.

At the output of the time-to-frequency converter CTF, a received signal $r_1$ is provided for the first receive antenna $AR_1$, each symbol $r_{m,n,1}$ of which received at the $n^{th}$ given time interval on the $m^{th}$ subcarrier can be given by the following relationship:

$$r_{m,n,1} = \alpha_{m,n,1} \times s_{m,n} + \beta_{m,n,1} \times u_{m,n} + b_{m,n,1}.$$

$s_{m,n}$ is a useful signal symbol received at the $n^{th}$ given time interval on the $m^{th}$ subcarrier. $\beta_{m,n,1} \times u_{m,n}$ is the product of a symbol $u_{m,n}$ of an interference signal by a transfer coefficient $\beta_{m,n,1}$ of the propagation channel associated with the interference signal. The product $\beta_{m,n,1} \times u_{m,n}$ is representative of intracellular and/or intercellular interferences received at the $n^{th}$ given time interval on the $m^{th}$ subcarrier by the first receive antenna $AR_1$. The interference signal is assumed to be of the same kind as the useful signal. The term is representative of the additive white Gaussian noise received at the $n^{th}$ given time interval on the $m^{th}$ subcarrier by the first receive antenna $AR_1$. The received symbol $r_{m,n,1}$ is an element of a matrix $r_1$ representing the symbols of the signal received by the first antenna:

$$r_1 = \begin{bmatrix} r_{0,0,1} & r_{0,1,1} & \cdots & r_{0,N-1,1} \\ r_{1,0,1} & r_{1,1,1} & \cdots & r_{1,N-1,1} \\ \cdots & \cdots & r_{m,n,1} & \cdots \\ r_{M-1,0,1} & r_{M-1,1,1} & \cdots & r_{M-1,N-1,1} \end{bmatrix} \in C^{N \times M}.$$

At the output of the time-to-frequency converter CTF is also provided a received signal $r_2$ for the second receive antenna $AR_2$ the shape of which is similar to that of the received signal $r_1$ for the first receive antenna $AR_1$ and of which each symbol $r_{m,n,2}$ received at the $n^{th}$ given time interval on the $m^{th}$ subcarrier is given by the following relationship:

$$r_{m,n,2} = \alpha_{m,n,2} \times s_{m,n} + \beta_{m,n,2} \times u_{m,n} + b_{m,n,2}.$$

According to the invention, the signal $r_1$ received by the first antenna $AR_1$ can be represented as a diagonal matrix $R_1$ of size NM×NM wherein the elements of the diagonal respectively correspond to elements of the matrix $r_1$ read on one row after another:

$$R_1 = \begin{bmatrix} r_{0,0,1} & 0 & & & \cdots & & & 0 \\ 0 & \ddots & 0 & & & & & \\ & 0 & r_{0,N-1,1} & 0 & & & & \\ & & 0 & \ddots & 0 & & & \\ \vdots & & & 0 & r_{m,n,1} & 0 & & \vdots \\ & & & & 0 & \ddots & 0 & \\ & & & & & 0 & r_{M-1,0,1} & 0 \\ & & & & & & 0 & \ddots & 0 \\ 0 & & & \cdots & & & & 0 & r_{M-1,N-1,1} \end{bmatrix}.$$

According to the invention, the signal $r_2$ received by the second antenna $AR_2$ can also be represented as a diagonal matrix $R_2$ of size NM×NM in the same way as the received signal $r_1$.

The coefficients $\alpha_{m,n,1}$, $\alpha_{m,n,2}$ are elements of a respective diagonal matrix $\alpha_1$, $\alpha_2$ of size NM×NM of the transfer function in the propagation channel associated with the useful signal between the respective emit antenna and the receive antenna $AR_1$, $AR_2$. Also, the coefficients $\beta_{m,n,1}$, $\beta_{m,n,2}$ are elements of a diagonal matrix $\beta_1$, $\beta_2$ of size NM×NM of the transfer function in the propagation channel associated with the interference signal between the respective emit antenna and the receive antenna $AR_1$, $AR_2$. Besides, the symbols $s_{m,n}$ and $u_{m,n}$ are respectively the elements of a matrix s and a diagonal matrix u of size NM×NM respectively representing the useful signal and the interference signal.

This present writing convention is retained in the following description.

Alternatively, the signal received by the first antenna or the second antenna can be represented as a diagonal matrix with size NM×NM, wherein the elements respectively correspond to elements of the matrix r read in one column after another.

The interference reducing module MRI performs a series of operations on the received signal in order to reduce the interferences mixed with the useful signal. The module MRI weights the received signals $r_1$ and $r_2$, respectively, represented as the diagonal matrices $R_1$ and $R_2$, respectively, by weighting vectors $w_1$ and $w_2$, wherein the weightings relating to the symbols of the first subcarrier are ranked successively, starting from the one corresponding to the first symbol time, and then weightings relating to the symbols of successive subcarriers. The module MRI sums the resulting vectors in order to form a combined received signal r', represented as a vector R', according to the following relationship:

$$R' = R_1 \cdot w_1 + R_2 \cdot w_2.$$

In the case where a single interference signal exists and in the absence of noise, the following is obtained:

$$R' = s \cdot (\alpha_1 w_1 + \alpha_2 w_2) + u \cdot (\beta_1 w_1 + \beta_2 w_2).$$

Further, the module MRI weights an estimate d of the emitted signal, represented as a diagonal matrix of size NM×NM, by a weighting vector $w_d$. In the case where a single interference signal exists and in the absence of noise, the weighting vector $w_d$ is equal to the expression $\alpha_1 w_1 + \alpha_2 w_2$.

The combined signal R' can therefore, in this case, been written as: $R' = s \cdot w_d + u \cdot (\beta_1 w_1 + \beta_2 w_2)$.

The estimate d of the emitted signal includes reference symbols which are known in advance by the receiver RE, such as pilot symbols, and/or reference symbols for which the receiver has sufficiently reliable knowledge, such as for example symbols, estimated during a preliminary processing, having a likelihood higher than a predetermined threshold. The position of pilot symbols among the M subcarriers and the N time intervals is known from the receiver. Besides the reference symbols, the estimate d of the emitted signal includes other symbols having a zero value.

The estimate d of the emitted signal can be represented as a diagonal matrix of size NM×NM wherein the diagonal elements are partly reference symbols having a non-zero value and wherein the other diagonal elements are zero. For example, if the estimate d of the emitted signal only includes pilot symbols, the diagonal of the matrix d only includes some non-zero values corresponding to the pilot symbols. If all the symbols of the emitted signal have been estimated in a preliminary processing as having a likelihood higher than the predetermined threshold, the estimate d of the emitted signal includes all these estimated symbols, and the diagonal of the matrix d is wholly full of non-zero values corresponding to the estimated symbols.

The interference reducing module MRI determines an error ε in the difference between the combined received signal R' and a signal corresponding to the weighted estimate of the emitted signal $d \cdot w_d$, according to the following relationship:

$$\epsilon = R' - d \cdot w_d.$$

In the case where a single interference signal exists and in the absence of noise, the following is obtained:

$$\epsilon = (s - d) \cdot w_d + u \cdot (\beta_1 w_1 + \beta_2 w_2).$$

Therefore, in this case, if the estimate d of the emitted signal is equal to the emitted signal s, that is if the estimate of the emitted signal is strictly the same as the signal actually emitted, then, for each symbol received in the $n^{th}$ time interval and on the $m^{th}$ subcarrier, the following is obtained:

$$w_{n,m,1} = \beta_{n,m,2};$$

$$w_{n,m,2} = -\beta_{n,m,1}; \text{ and}$$

$$w_{n,m,d} = \beta_{n,m,2} \cdot \alpha_{n,m,1} - \beta_{n,m,1} \cdot \alpha_{n,m,2}.$$

According to the invention, the vectors $w_1$, $w_2$ and $w_d$ each have as many components as the number of symbols in the considered OFDM frame, and are selected in a vector subspace.

Therefore, the following matrix representations are imposed, in order to solve more easily the problem being posed:

$$w_1 = B \cdot a_1,$$

$$w_2 = C \cdot a_2, \text{ and}$$

$$w_d = D \cdot a_d,$$

wherein B, C and D are rectangular matrices wherein the number of columns is lower than the number of rows. The matrices B, C and D each define the basis of vectors in the vector subspace. The selection of the basis defining the vector subspace is performed such that the vector subspace vectors satisfy the physical constraints of the propagation channel, such as a maximum value of frequency spreading and a maximum value of time spreading.

The matrices B, C and D can be determined in different ways. In a preferred embodiment of the invention, the matrices B and C are two identical matrices, the physical constraints applied to them being of the same type.

According to the invention, the module MRI reduces error ε by determining weighting vectors $w_1$, $w_2$ and $w_d$ which minimize a function of the error ε. The signal r' is therefore processed in order to estimate the emitted signal.

The previously described processing can be applied iteratively, with the data estimated at iteration i being partly or entirely used as an estimate d of the emitted signal for the following iteration i+1. The noise and interferences are reduced by estimating on each iteration the emitted signal and by computing, for each symbol of the OFDM frame, the difference between the weighted estimate of the emitted signal and the weighted sum of the signals respectively received by the antennas until this difference tends toward a limit value.

After determining the weighting vectors, the module MRI equalizes the symbols of the combined signal r' according to the weighting vectors $w_1$, $w_2$ and $w_d$ into equalized symbols. The weighting vectors $w_1$ and $w_2$ allow the combined signal r' to be determined according to the following relationship: $R' = R_1 \cdot w_1 + R_2 \cdot w_2$. For example, an equalized symbol depends on the division of the symbol in the combined signal r' by a corresponding element of the weighting vectors $w_d$, it being known, in an illustrative way, that the combined signal r' can be retained, when a single interference signal is present in addition to the useful signal and therefore in the absence of noise, according to the following relationship: $R' = s \cdot w_d + u \cdot (\beta_1 \cdot w_1 + \beta_2 \cdot w_2)$, with interferences being reduced by minimizing the expression $(\beta_1 \cdot w_1 + \beta_2 \cdot w_2)$. When noise is also present, this expression remains a valid approximation since in the signal r', the emitted signal s weighted by $w_d$ is present with noise and the remaining interferences, both latter members being minimized by the processing performed according to the invention.

The equalized symbols are demodulated by the demodulator DEM into demodulated bits according to the modulation type used upon emission. The demodulator DEM further determines a likelihood of each demodulated bit. The likelihood of a bit has a negative or positive (fluctuating) "soft" value, in comparison with a "hard" value such as the binary value "1" or "0", in order to indicate that the demodulator DEM supplies real floating values each having a sign that imposes a subsequent decision on the state of the corresponding bit, i.e. a decision on the "hard" value "0" or "1".

The demodulator DEM which has not performed any decision in order to determine "hard" binary values "0" or "1" provides in series the numerical values of demodulated bit likelihood to the decoder DEC, such values being for example between −1 and +1 according to a predetermined standard.

Optionally, a deinterleaver performs a deinterleaving of the likelihoods of demodulated bits according to a channel deinterleaving algorithm that is the reciprocal of a channel interleaving algorithm used in an interleaver of the emitter, in order to inhibit the interleaving introduced on emitting the signal.

The decoder DEC decodes demodulated, optionally deinterleaved bits provided by the demodulator DEM as a function of the previously determined likelihoods. The decoder DEC makes a hard decision and delivers decoded bits, according to the decoding corresponding to the encoding used on emission of the signal, for example according to a convolutional decoding that corrects errors by means of the Viterbi algorithm.

Optionally, the receiver RE further includes an emit simulator SE in order to reconstruct the received signal without neither noise nor interference, i.e. the corresponding emitted signal. For example, the emit simulator SE includes an encoder, optionally an interleaver, a modulator and a frequency-to-time converter.

The decoder DEC outputs bits, on which a hard decision has been made, to the emit simulator SE in order for the latter to simulate an emit chain of the estimate d of the emitted signal previously described and corresponding to the signal assumed to be received with neither noise nor interference.

For this purpose, in the emit simulator SE, bits outputting from the decoder DEC are applied to the encoder, before being optionally interleaved by the interleaver. Then, these bits are supplied to the modulator to form estimated symbols $d_{m,n}$ of the estimate d of the emitted signal, with $0 \leq m \leq M-1$ and $0 \leq n \leq N-1$, respectively corresponding to the received symbols which would not have undergone any channel deformation. In other words, each estimated symbol $d_{m,n}$ is a better hypothesis of a respective emitted symbol and corresponds to the bits of a respective received symbol from the decoder DEC. Each estimated symbol $d_{m,n}$ is a signal symbol assumed to be reconstructed with neither noise nor interference derived from a respective received symbol of the decoded received signal.

The estimated symbols $d_{m,n}$ can be applied to a frequency-to-time converter and in particular undergo an inverse fast Fourier transform IFFT to move the signal comprising the estimated symbols $d_{m,n}$ from the frequency domain to the time domain, and an emit time filtering. The frequency-to-time converter outputs an estimate comprising the estimated symbols to a second time-to-frequency converter which applies to the estimate of the emitted signal a time filtering on reception suitable for the time filtering on emission, and then a fast Fourier transform FFT to move the estimate of the emitted signal from the time domain to the frequency domain, in a similar way to the filtering and the transforming in the converter CTF. The second time-to-frequency converter supplies an estimate of the emitted signal comprising estimated symbols $d_{m,n}$ to the interference reducing module MRI.

The diagonal matrix representing the estimate d of the emitted signal has non-zero values which only correspond to sufficiently reliable symbols, such a symbol having for example an overall likelihood which is the product of likelihoods respectively combined to bits of the symbol and which is higher than a predetermined threshold.

Figure 4:
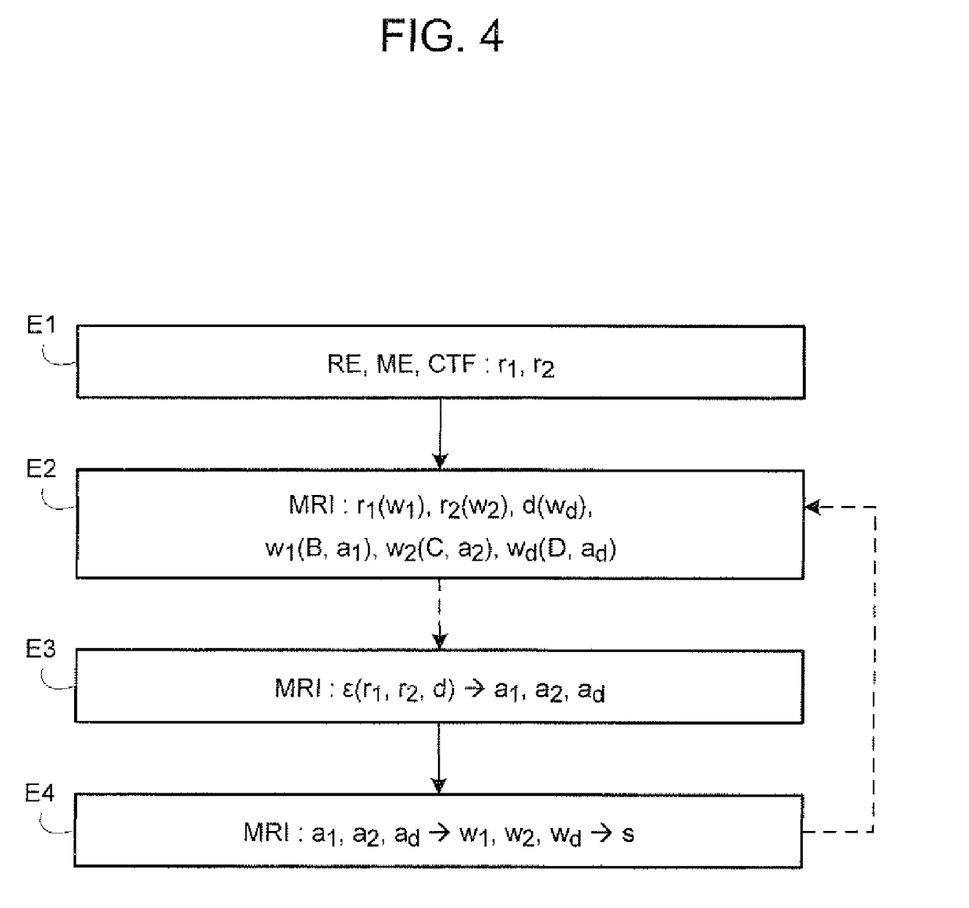
FIG. 4 is an algorithm of an interferences reducing method according to the invention.

Referring to FIG. 4, the interference reducing method according to the invention includes steps E1 to E4 automatically performed in the receiver RE.

At step E1, each receive antenna $AR_1$, $AR_2$ of the receiver RE receives a respective signal $r_1$, $r_2$ which has been emitted by an emitter as successive frames including symbols distributed according to frequency and time dimensions. The signal is emitted, for example, on M subcarriers in a frame divided into N symbol time intervals, for example according to an orthogonal frequency division multiplexing modulation OFDM. As explained previously each received signal is applied to the input module ME and the time-to-frequency converter CTF to move the received signal from the time domain to the frequency domain, and the received signal is represented as a diagonal matrix of size NM×NM.

At step E2, the interference reducing module MRI weights the received signals $r_1$ and $r_2$, respectively by weighting vectors $w_1$ and $w_2$ having contents to be determined and sums the weighted signals $r_1$ and $r_2$ to form a combined signal r'. Besides, the module MRI weights an estimate d of the emitted signal, including for example pilot symbols, by a weighting vector $w_d$ having contents to be determined. The vectors $w_1$, $w_2$ and $w_d$ are column vectors, each including as many rows as the received signal in a frame has symbols, i.e. N×M rows.

The weighting vectors $w_1$ and $w_2$ are respectively expressed as the product of a matrix B and a reduced vector $a_1$ and as the product of a matrix C and a reduced vector $a_2$ according to the following relationship:

$$w_1 = B \cdot a_1; \text{ and}$$

$$w_2 = C \cdot a_2.$$

In a similar way, the weighting vector $w_d$ is expressed as the product of a matrix D and a reduced vector $a_d$ according to the following relationship:

$$w_d = D \cdot a_d.$$

The matrices B, C and D are rectangular matrices wherein the number of columns is lower than the number of rows.

The reduced vectors $a_1$, $a_2$ and $a_d$ are column vectors having a number of coefficients lower than the number of symbols, which the received signal contains in a frame.

The matrices B and C each define a vector subspace representing time variations and frequency variations of the propagation channel. Since the constraints are the same for the matrices B and C, both matrices are preferably selected to be identical.

The matrix D defines a vector subspace representing time and frequency variations of the product of two propagation channels. The matrix D is homogenous to the product of the propagation channel associated with the useful signal and the propagation channel associated with the interference signal.

For example, the matrix B can be a matrix derived from a matrix K which is the Kronecker product of a first matrix, called as a Fourier transform [FFT] matrix, having a size M×M for expressing a constraint on the time profile of the propagation channel observed along the frequency axis (on any of the time intervals), by a second matrix, called as an inverse Fourier transform [IFFT] matrix, having a size N×N for expressing a constraint on the frequency spectrum of the propagation channel observed along the time axis (on any of the subcarriers).

The matrix K can be written in the following way:
K=[FFT]×[IFFT], wherein the operator×conventionally represents the Kronecker product of two matrices.

The matrix K can also be written in the following way:

$$K = \begin{bmatrix} [IFFT] \cdot FFT(0,0) & \cdots & [IFFT] \cdot FFT(0, M-1) \\ \vdots & \ddots & \vdots \\ [IFFT] \cdot FFT(M-1, 0) & \cdots & [IFFT] \cdot FFT(M-1, M-1) \end{bmatrix},$$

wherein $$[IFFT] = \begin{bmatrix} IFFT(0,0) & \cdots & IFFT(0, N-1) \\ \vdots & \ddots & \vdots \\ IFFT(N-1, 0) & \cdots & IFFT(N-1, N-1) \end{bmatrix}, \text{ and}$$

$$[FFT] = \begin{bmatrix} FFT(0,0) & \cdots & FFT(0, M-1) \\ \vdots & \ddots & \vdots \\ FFT(M-1, 0) & \cdots & FFT(M-1, M-1) \end{bmatrix}.$$

For example, the [FFT] matrix is written as follows:

$$[FFT] = \begin{bmatrix} 1 & 1 & \cdots & 1 \\ 1 & e^{\frac{-2i\pi}{M}} & \cdots & e^{\frac{-2i\pi(M-1)}{M}} \\ \vdots & \vdots & \cdots & \vdots \\ 1 & e^{\frac{-2i\pi(M-1)}{M}} & \cdots & e^{\frac{-2i\pi(M-1)^2}{M}} \end{bmatrix}.$$

The [IFFT] matrix is the conjugated matrix of a [FFT] matrix of size N×N. For example, the term IFFT(0,0) is equal to "1" and the term IFFT(n,N) is equal to "exp((2 πin(N−1))/N)", wherein i is the complex number being the square root of "−1".

Columns in the matrices B and C are suppressed and the rows in the associated reduced vectors $a_1$ and $a_2$ corresponding to the suppressed columns of the matrices B and C are also suppressed. In the same way, columns in the matrix D are suppressed and the rows in the associated reduced vector $a_d$ corresponding to the suppressed columns of the matrix D are also suppressed. The matrices B, C and D are therefore rectangular matrices having N×M rows and a number of columns lower than N×M.

The columns of matrices B, C and D are suppressed as function of at least one of the parameters of the propagation channels between the emitter and the receive antennas $AR_1$ and $AR_2$ of the receiver, relating to physical constraints of the propagation channels. Such physical constraints are for example, on the one hand, the maximum frequency spreading in the propagation channel when the latter is observed along the time axis on any of the subcarriers and when the Fourier transform thereof is taken to obtain a frequency spectrum thereof, and, on the other hand, the maximum time spreading of the propagation channel when the latter is observed along the frequency axis for any of the time intervals and the inverse Fourier transform thereof is taken to obtain the time profile thereof.

According to an orthogonal frequency division multiplexing modulation OFDM, the frequency bandwidth of the M subcarriers is much lower than the frequency Fp of the carrier of the emitted signal which is the average of the frequencies of respective subcarriers. The frequency band of the M subcarriers is for example centered on the frequency Fp of the signal carrier. For example, the frequency of the carrier is 3 GHz and the frequency pitch between two successive subcarriers is 10 kHz.

Similarly, according to an orthogonal frequency division multiplexing modulation OFDM, the N symbols associated with a carrier of the signal are received successively and steadily for N respective time intervals and correspond to the reception of emitted signal according to several propagation paths, each having an associated propagation delay.

A physical constraint of the propagation channel relating to frequency is for example a maximum Doppler frequency $F_{max}$ which depends on a maximum speed $V_{max}$ of relative displacement between an emitter and the receiver RE and on the frequency of the carrier Fp, with the maximum displacement speed $V_{max}$ being for example 200 km/hr. The maximum Doppler frequency $F_{max}$ is $F_{max}=(V_{max}/c)Fp$, wherein c is light speed.

In the matrix B, respectively the matrix C, the columns of the [IFFT] matrix which correspond to frequencies lying between frequencies $-F_{max}$ and $+F_{max}$ are kept and all other columns which correspond to frequencies beyond frequencies $-F_{max}$ and $+F_{max}$ are suppressed. For example, the index of the frequency corresponding to the frequency $F_{max}$ in the frequency spectrum of the received signal and in the [IFFT] matrix is denoted $n_F$, with $0<n_F<N-1$, such that the columns of the [IFFT] matrix having an index between $n_F$ and $N-n_F$ are suppressed. The [IFFT] matrix with suppressed columns is for example under the following form:

$$[IFFT] = \begin{bmatrix} 1 & 1 & \cdots & 1 & 1 & \cdots & 1 \\ 1 & e^{\frac{+2i\pi}{N}} & \cdots & e^{\frac{+2i\pi n_F}{N}} & e^{\frac{+2i\pi(N-n_F)}{N}} & \cdots & e^{\frac{+2i\pi(N-1)}{N}} \\ \vdots & \cdots & \cdots & \cdots & \cdots & \cdots & \vdots \\ 1 & e^{\frac{+2i\pi(N-1)}{N}} & \cdots & e^{\frac{+2i\pi n_F(N-1)}{N}} & e^{\frac{+2i\pi(N-n_F)(N-1)}{N}} & \cdots & e^{\frac{+2i\pi(N-1)^2}{N}} \end{bmatrix}.$$

In the matrix D, the columns of the [IFFT] matrix which correspond to frequencies lying between frequencies $-2 F_{max}$ and $+2 F_{max}$ are kept and all the other columns which correspond to frequencies beyond frequencies $-2 F_{max}$ and $+2 F_{max}$ are suppressed.

The limits of the frequencies are indeed doubled since the matrix D is homogeneous to the product of the propagation channel associated with the useful signal and the propagation channel associated with the interference signal. The index $n_F$ for the matrix D is therefore twice as much as the index $n_F$ for the matrix B and the [IFFT] matrix for the matrix D contains about twice as many columns as the [IFFT] matrix for the matrix B.

The columns of matrices B and D which are kept correspond to low frequencies around the carrier frequency and lower than the maximum Doppler frequency.

A physical constraint of the propagation channel relating to time is for example the time spreading of the propagation channel limited to a maximum delay $\tau_{max}$ among different possible path delays for the received signal. These different path delays are statistically known depending on the frequency of the carrier of the signal and the environment in which the signal is emitted and on which the time spreading of the propagation channel depends. For example, for a carrier frequency in the ultrahigh frequency band UHF, in an urban environment, the time spreading is typically limited to a maximum delay $\tau_{max}$ of 5 µs, and in an uneven environment of mountain type, the time spreading is typically limited to a maximum delay $\tau_{max}$ of 15 µs.

The time spreading of the propagation channel can be increased due to the processing of some members in the emit chain or the receive chain of the signal, such as a radio filter of the receiver which can cause additional time dispersion of the signal.

In the matrix B, respectively the matrix C, the columns of the [FFT] matrix which correspond to time intervals lying between the times t=0 and t=$\tau_{max}$ in the time profile of the received signal are kept and all the other columns which correspond to delays beyond time t=$\tau_{max}$ are suppressed. For example, the index of the time interval corresponding to time t=$\tau_{max}$ in the time spectrum of the received signal and in the [FFT] matrix is denoted $m_\tau$, with $0<m_\tau<M-1$, such that the columns of the [FFT] matrix having an index higher than $m_\tau$ are suppressed. The [FFT] matrix with the suppressed columns is for example under the following form:

$$[FFT] = \begin{bmatrix} 1 & 1 & \ldots & 1 \\ 1 & e^{\frac{-2i\pi}{M}} & \ldots & e^{\frac{-2i\pi m_\tau}{M}} \\ \vdots & \vdots & \ldots & \vdots \\ 1 & e^{\frac{-2i\pi(M-1)}{M}} & \ldots & e^{\frac{-2i\pi m_\tau(M-1)}{M}} \end{bmatrix}.$$

In the matrix D, the columns of the [FFT] matrix which correspond to time intervals lying between times t=0 and t=2 $\tau_{max}$ in the time profile of the received signal are kept and all the other columns which correspond to delays beyond time t=2$\tau_{max}$ are suppressed. As for frequencies, the limits of time intervals are doubled since the matrix D is homogeneous to the product of the propagation channel associated with the useful channel and the propagation channel associated with the interference signal. The index $m_\tau$ for the matrix D is therefore twice as much as the index $m_\tau$ for the matrix B and the [FFT] matrix for the matrix D contains about twice as many columns of the [FFT] matrix for the matrix B.

After suppressing the columns in the [IFFT] and [FFT] matrices, the matrices B and D contain N×M rows and a number of columns lower than N×M.

If the columns of the matrices B and D are suppressed only as function of a parameter of the propagation channel, the [IFFT] matrix or [FFT] matrix alone corresponding to the dimension associated with the parameter of the propagation channel has suppressed columns, and the other matrix has no suppressed columns.

At step E3, the interference reducing module MRI determines an error $\epsilon$ in the difference between the combined signal r' and the estimated received signal $d \cdot w_d$ corresponding to the estimate d of the emitted signal weighted by the weighting vector $w_d$ according to the following relationship:

$\epsilon = R' - d \cdot w_d$, i.e.

$\epsilon = R_1 \cdot w_1 + R_2 \cdot w_2 - d \cdot w_d$.

The module MRI minimizes this error $\epsilon$, or more precisely a function of this error $\epsilon$, which can be written as follows:

$$\varepsilon = R_1 \cdot B \cdot a_1 + R_2 \cdot B \cdot a_2 - d \cdot D \cdot a_d, \text{ or}$$

$$\varepsilon = [R_1 \; R_2 \; -d] \begin{bmatrix} B & 0 & 0 \\ 0 & B & 0 \\ 0 & 0 & D \end{bmatrix} \begin{bmatrix} a_1 \\ a_2 \\ a_d \end{bmatrix}, \text{ or even}$$

$$\varepsilon = R \cdot G \cdot A, \text{ with}$$

$$R = [R_1 \; R_2 \; -d], G = \begin{bmatrix} B & 0 & 0 \\ 0 & B & 0 \\ 0 & 0 & D \end{bmatrix}, \text{ and } A = \begin{bmatrix} a_1 \\ a_2 \\ a_d \end{bmatrix}.$$

In one embodiment of the invention, minimizing the error $\epsilon$ is performed by minimizing the squared standard of the error $\epsilon$. In order to find a solution other than the usual solution wherein all the elements of the vector A are zero, an arbitrary constraint is determined.

According to a first example, an arbitrary constraint is to impose the first element of the vector $a_d$ equal to a constant. More generally, the constraint can be to impose that there is a linear combination of elements of the vector A which is equal to a constant.

In a particular case, the constraint can be to impose that there is an element of the vector A which is equal to a constant, which can be written as follows:

$A^H \cdot [J] = \gamma$, with $[J] = [0 \ldots 010 \ldots 0]^H$, wherein $\gamma$ is a constant, the exponent H denotes the conjugated transposition operator of the matrix and the position of the value "1" in the matrix in column J is placed in accordance with the selection of the constraint to be imposed.

According to the same example, the vector A can be determined using a Lagrange multiplier denoted $\lambda$. With the defined notations in the preceding example, the arbitrary constraint amounts to minimizing the following expression:

$\|R \cdot G \cdot A\|^2 - \lambda(A^H \cdot [J] - \gamma)$.

The vector A is defined by the following relationship:

$A = \lambda(G^H \cdot R^H \cdot R \cdot G)^{-1} [J]$,

Yet, because of the constraint, there is $A^H \cdot [J] = \gamma$ a constant, and the following is obtained:

$\lambda = \gamma/([J]^H (G^H \cdot R^H \cdot R \cdot G)^{-1} [J])$, therefore $A = \gamma(G^H \cdot R^H \cdot R \cdot G)^{-1} [J])/([J]^H (G^H \cdot R^H \cdot R \cdot G)^{-1} [J])$.

The invention is not limited to such examples and the arbitrary constraint can be any other constraint for minimizing the error s by eliminating the solution wherein all the elements of the matrix A are zero, for example by minimizing the estimate of the average binary error rate estimated after demodulating the symbols of the received signal.

Thus, the module MRI determines all the elements of the vector A by minimizing the error $\epsilon$, and derives the reduced vectors $a_1$, $a_2$ and $a_d$.

At step E4, the module MRI derives from the expression of the reduced vectors $a_1$, $a_2$ and $a_d$ respectively, the weighting vectors $w_1$, $w_2$ and $w_d$ as a function of the matrices B, C and D.

The module MRI determines the contents of the combined signal r' as a function of the weighting vectors $w_1$ and $w_2$ and the matrices of the received signals $R_1$ and $R_2$ according to the following relationship: $R' = R_1 \cdot w_1 + R_2 \cdot w_2$.

The module MRI then estimates the symbols of the useful signal s as a function of the combined signal r' and the weighting vectors $w_d$, which represents the overall channel undergone by the signal r'.

According to the invention, the contribution of the interference signal u as well as the influence of the noise are significantly reduced and the symbols of the useful signal s are estimated after a demodulation by the demodulator PEM followed by a decoding of the symbols of the combined signal r' by the decoder DEC, as previously described.

Steps E2 to E4 can be iterative. For example, in a first iteration, the estimate d of the emitted signal includes reference symbols which are pilot symbols. In following iterations, the estimate d of the emitted signal includes reference symbols for which the receiver has a sufficiently reliable knowledge, such as the pilot symbols and estimated symbols which come from the step E4 decoding the symbols of the combined signal r' and which have a higher likelihood than a predetermined threshold.

According to the invention, the decoded signal in the receiver becomes less sensitive to interference from signals propagated in similar channels to the propagation channel of the received signal.

Indeed, in the case of signals received with an interference signal and without noise, for each symbol of an OFDM signal frame, referring to the above described notations, the following can be written:

$$r_1 = \alpha_1 \cdot s + \beta_1 \cdot u, \text{ and}$$

$$r_2 = \alpha_2 \cdot s + \beta_2 \cdot u.$$

According to the prior art, referring to FIG. 1, in order to suppress the existing interference and to obtain the estimate d of the emitted signal equal to the emitted signal s, the received signals just have to be combined the following way, it being known that the difference between the signal r' and the estimate d of the emitted signal should be zero:

$$r' = w_1 \cdot r_1 + w_2 \cdot r_2 = s, \text{ i.e.}$$

$$r' = (\beta_2 \cdot r_1 - \beta_1 \cdot r_2)/(\beta_2 \cdot \alpha_1 - \beta_1 \cdot \alpha_2),$$

with weightings applied to the signals respectively received by the antennas as follows:

$$w_1 = \beta_2/(\beta_2 \cdot \alpha_1 - \beta_1 \cdot \alpha_2), \text{ and}$$

$$w_2 = -\beta_1/(\beta_2 \cdot \alpha_1 - \beta_1 \cdot \alpha_2).$$

According to the prior art, these terms therefore have a relatively complex shape since the coefficients $\alpha_1$ and $\alpha_2$ relate to propagation channels, and the vectors $w_1$ and $w_2$ are homogeneous to the reciprocal of a transmission channel. Such shape does not allow the problem to be solved readily.

The method according to this invention therefore provides an approach simplifying the solving of the problem by setting the same in a linear form.

The invention described here relates to a method and a receiver for reducing interferences in at least two signals received by a receiver through a propagation channel. In one implementation, the steps of the method of the invention are determined by the instructions of a computer program incorporated in the receiver. The program includes program instructions which carry out the steps of the method according to the invention when said program is executed in the receiver, whose operation is then controlled by the execution of the program.

Consequently, the invention also applies to a computer program, in particular a computer program stored on or in a storage medium readable by a computer and by any data processing device adapted to implement the invention. This program can use any programming language and take the form of source code, object code or an intermediate code between source code and object code, such as a partially compiled form, or any other form desirable for implementing the method according to the invention.

The storage medium can be any entity or device capable of storing the program. For example, the medium can include storage means in which the computer program according to the invention is stored, such as a ROM, for example a CD ROM or a microelectronic circuit ROM, a USE key, or magnetic storage means, for example a diskette (floppy disk) or a hard disk.

The invention claimed is:

1. A method for reducing interferences in at least two signals received by a receiver (RE) through a propagation channel, the received signals each including symbols distributed according to frequency and time dimensions and corresponding to a common emitted signal, comprising, for each received signal frame:
    weighting (E2) the symbols of each received signal respectively by coefficients of a weighting vector ($w_1$, $w_2$) associated with a respective antenna of the receiver and the symbols of an estimate (d) of the emitted signal (d) by coefficients of another weighting vector ($w_d$), the weighting vectors ($w_1$, $w_2$, $w_d$) each being a product of a rectangular matrix (B, C, D) having a number of columns lower than the number of rows and a reduced vector ($a_1$, $a_2$, $a_d$), the matrices being determined as a function of physical constraints of the propagation channel relating to frequency spreading and time spreading,
    minimizing (E3) a function of the difference between the sum of the weighted received signals (r') and the weighted estimate of the emitted signal in order to determine the reduced vectors, and
    determining (E4) the weighting vectors as a function of the determined reduced vectors ($w_1$, $w_2$, $w_d$) and estimating the emitted signal as a function of the determined weighting vectors and the received signals.

2. A method as claimed in claim 1, wherein the rectangular matrices (B, C) relating to the received signals are identical.

3. A method as claimed in claim 1, wherein, for each received signal frame, the symbols of the frame are arranged from the first symbol of each subcarrier of the signal to the last symbol of the subcarrier, each subcarrier being ranked after the previous one, and the rectangular matrices are matrices deriving from the Kronecker product of first and second Fourier matrices.

4. A method as claimed in claim 3, wherein, for the rectangular matrices (B, C) relating to the received signals, the columns of the first Fourier matrix corresponding to time delay components located beyond a maximum time spreading ($\tau_{max}$) of the propagation channel are suppressed, and for the rectangular matrix (D) relating to the estimate of the emitted signal, the columns of the first Fourier matrix corresponding to time delay components located beyond a twofold maximum time spreading ($2\tau_{max}$) of the propagation channel are suppressed.

5. A method as claimed in claim 3, wherein, for the rectangular matrices (B, C) relating to the received signals, the columns of the second Fourier matrix corresponding to the frequency components located outside a frequency spreading range of the propagation channel are suppressed, said frequency spreading range being dependent on the Doppler frequency ($F_{max}$) corresponding to a maximum speed of relative displacement between an emitter and the receiver, and for the rectangular matrix (D) relating to the estimate of the emitted signal, the columns of the second Fourier matrix corresponding to frequency components located outside a range corresponding to a twofold frequency spreading of the propagation channel are suppressed.

6. A method as claimed in claim 1, wherein the estimate (d) of the emitted signal includes pilot symbols.

7. A method as claimed in claim 1, wherein the estimate (d) of the emitted signal includes estimations of emitted symbols obtained in a previous processing.

8. A method as claimed in claim 1, wherein the values of the estimate (d) of the emitted signal are taken into account only for some symbols of the received signal frame, and including minimizing the function of the difference between the sum of the weighted received signals (r') and the weighted estimate of the emitted signal, said difference being limited to said some symbols of the received signal frame.

9. A method as claimed in claim 1, wherein the weighting, minimizing and determining steps are iterative.

10. A method as claimed in any claim 1, including minimizing the sum of the squared standard of the values of the difference between the sum of the weighted received signals (r') and the weighted estimate of the emitted signal for all the symbols in the received signal frame, under the constraint that there is at least one linear combination of the components of the reduced vectors ($a_1, a_2, a_d$) which is constant.

11. A method as claimed in claim 1, including minimizing the function of the difference between the sum of the weighted received signals (r') and the weighted estimate of the emitted signal, said function being the average of binary error rates estimated after demodulating symbols in the received signal frame.

12. A radio communication receiver (RE) for reducing interferences in at least two signals ($r_1, r_2$) received by the receiver through a propagation channel, the received signals each including symbols distributed according to frequency and time dimensions, and corresponding to a common emitted signal, comprising:

means (MRI) for weighting the symbols of each received signal respectively by coefficients of a weighting vector ($w_1, w_2$) associated with a respective antenna of the receiver and the symbols of an estimate (d) of the emitted signal by coefficients of another weighting vector ($w_d$), the weighting vectors ($w_1, w_2, w_d$) being each a product of a rectangular matrix (B, C, D) having a number of columns lower than the number of rows and a reduced vector ($a_1, a_2, a_d$), the matrices being determined as a function of physical constraints of the propagation channel relating to frequency spreading and time spreading, means (MRI) for minimizing a function of the difference between the sum of the weighted received signals (r') and the weighted estimate of the emitted signal in order to determine the reduced vectors, and means (MRI) for determining the weighting vectors ($w_1, w_2, w_d$) as a function of the determined reduced vectors and estimating the emitted signal as a function of the determined weighting vectors and the received signals.

13. A computer program adapted to be implemented in a receiver (RE) for reducing interferences in at least two signals ($r_1, r_2$) received by a receiver (RE) through a propagation channel, the received signals each including symbols distributed according to frequency and time dimensions and corresponding to a common emitted signal, said program comprising program instructions which carry out the following steps when said program is executed in said receiver:

weighting (E2) the symbols of each received signal respectively by coefficients of a weighting vector ($w_1, w_2$) associated with a respective antenna of the receiver and the symbols of an estimate (d) of the emitted signal (d) by coefficients of another weighting vector ($w_d$), the weighting vectors ($w_1, w_2, w_d$) each being a product of a rectangular matrix (B, C, D) having a number of columns lower than the number of rows and a reduced vector ($a_1, a_2, a_d$), the matrices being determined as a function of physical constraints of the propagation channel relating to frequency spreading and time spreading, minimizing (E3) a function of the difference between the sum of the weighted received signals (r') and the weighted estimate of the emitted signal in order to determine the reduced vectors, and determining (E4) the weighting vectors as a function of the determined reduced vectors ($w_1, w_2, w_d$) and estimating the emitted signal as a function of the determined weighting vectors and the received signals.

* * * * *